H. C. GOELTZ.
COMBINED SAD IRON HEATER AND OVEN.
APPLICATION FILED SEPT. 2, 1908.

950,020.

Patented Feb. 22, 1910.

Witnesses:
H. L. Fischer
R. A. Fischer

Inventor:
Henry C. Goeltz,
by: F. C. Bradbury
Attorney.

UNITED STATES PATENT OFFICE.

HENRY C. GOELTZ, OF ST. PAUL, MINNESOTA.

COMBINED SAD-IRON HEATER AND OVEN.

950,020.  Specification of Letters Patent.  Patented Feb. 22, 1910.

Application filed September 2, 1908. Serial No. 451,334.

*To all whom it may concern:*

Be it known that I, HENRY C. GOELTZ, a citizen of the United States, residing at St. Paul, in the county of Ramsey and State of Minnesota, have invented a new and useful Improvement in Combined Sad-Iron Heaters and Ovens, of which the following is a specification.

My invention relates to improvements in a combined sad-iron heater and oven and has for its primary object a device of this kind which is simple and inexpensive in construction and effective in operation.

This invention is adapted for domestic purposes and will perform two functions, first, of producing an efficient heater for sad irons and other devices when it is desirable to heat them to a high temperature by close proximity to the burner and second of producing an efficient oven when the heat is more diffused from the bottom of the device and the application of the burner not as intimate therewith.

Figure 1:
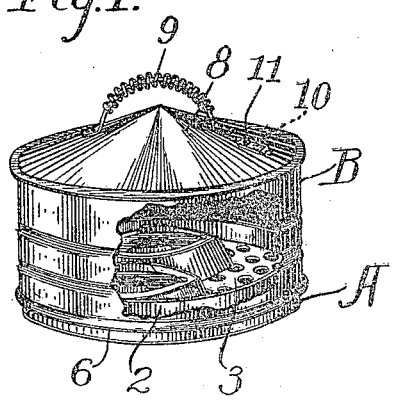
Figure 3:
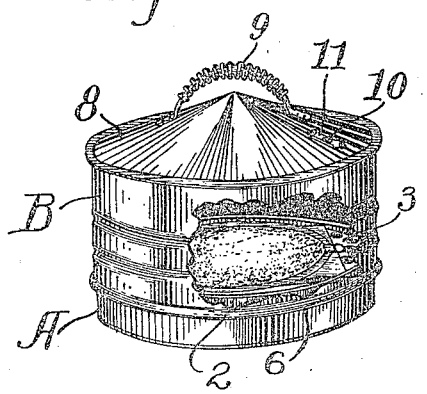
Figure 2:
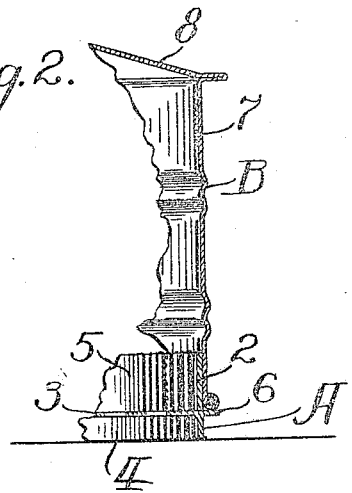
Figure 4:
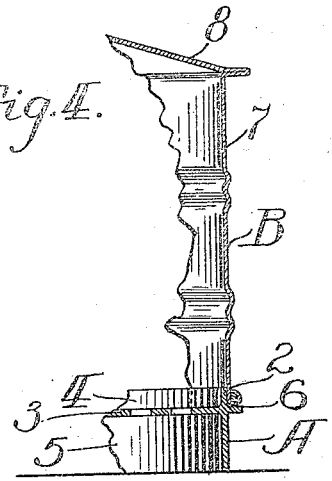

In the accompanying drawings forming part of this specification, Figure 1 is a perspective view of my invention showing a portion broken away and the parts of the device assembled when used for heating sad-irons; Fig. 2 is a sectional view of a detail portion of my invention showing the parts assembled when used as in Fig. 1; Fig. 3 is a perspective view of my invention, a portion thereof being broken away and showing the parts assembled when used as an oven, and Fig. 4 is a sectional view of a detail portion of my invention showing the parts assembled when used as in Fig. 3.

In the drawings, A represents the base and B the cover over the base. The base is formed by a vertical cylindrical shell 2 having a horizontal bottom 3 which is set in said shell, shallow in the side 4, and deep in the other side 5. Lying in substantially the same horizontal plane as the bottom 3 and projecting from the outer surface of the shell 2, is an annular shoulder 6.

The cover B is in the form of a cylindrical casing 7 having its upper end closed by a conical top or roof 8 to which is attached a handle 9. In this conical top is a vent opening 10 and a slide or closure 11 by which the vent opening can be closed, opened or modified. The lower end of the cylindrical casing 7 is adapted to slide over the shell 2 and rest upon the shoulder 6 and thus form a canopy or closure over the base.

When it is desired to use the invention for heating sad irons, the base is turned with the shallow side of the bottom down as illustrated in Figs. 1 and 2 and the cover is closed over the base with the vent opening 10 also closed. In this condition the bottom is adapted to be placed in intimate association with the flame of the burner below to efficiently and effectively heat sad irons which are placed upon the bottom.

When it is desired to use the invention as an oven, the ventilated bottom is turned up with the deep side down as shown in Figs. 3 and 4. A small iron tray is then placed over the holes in the bottom and an asbestos mat placed on the tray. Food can then be placed in the oven on the asbestos mat and baked brown without danger of burning, the heat from the flame below being evenly diffused throughout the entire inclosure. When using the device as an oven, the vent in the cover can be opened for the egress of steam from within.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claim.

Having described my invention, what I claim as new and desire to protect by Letters Patent is:

A device of the class set forth, comprising, in combination, a base having a cylindrical shell, an open work bottom set shallow in one end of said shell and deep in the other and a lateral shoulder on the outside of said shell and a cover having a cylindrical casing adapted to slip over the outside of said shell and to rest upon said shoulder when said base is standing on either end; whereby said base is adapted to be placed with its bottom intimately associated with a flame below when standing on one end and to be placed with its bottom at a greater distance from said flame when standing on its other end so as to produce a hot or modified degree of temperature on the bottom, for the purposes specified.

In testimony whereof, I have signed my name to this specification, in the presence of two subscribing witnesses.

HENRY C. GOELTZ.

Witnesses:
H. L. FISCHER,
F. G. BRADBURY.